(12) United States Patent
Kaneko

(10) Patent No.: US 8,684,607 B2
(45) Date of Patent: Apr. 1, 2014

(54) THRUST SLIDING BEARING AND COMBINATION MECHANISM OF THE THRUST SLIDING BEARING AND PISTON ROD WITH COIL SPRING

(75) Inventor: Ryohei Kaneko, Kanagawa (JP)

(73) Assignee: Oiles Corporation, Tokyo (JP)

( * ) Notice: Subject to any disclaimer, the term of this patent is extended or adjusted under 35 U.S.C. 154(b) by 477 days.

(21) Appl. No.: 12/531,538

(22) PCT Filed: Mar. 19, 2008

(86) PCT No.: PCT/JP2008/000658
§ 371 (c)(1),
(2), (4) Date: Sep. 16, 2009

(87) PCT Pub. No.: WO2008/114514
PCT Pub. Date: Sep. 25, 2008

(65) Prior Publication Data
US 2010/0104228 A1 Apr. 29, 2010

(30) Foreign Application Priority Data
Mar. 20, 2007 (JP) .................................. 2007-073627

(51) Int. Cl.
*F16C 17/04* (2006.01)
(52) U.S. Cl.
USPC ........................................................... 384/420
(58) Field of Classification Search
USPC ......... 384/228, 297, 299, 300, 303, 368, 420, 384/422, 425; 280/124.145, 124.147, 280/124.155; 267/220
See application file for complete search history.

(56) References Cited

U.S. PATENT DOCUMENTS

| 4,325,566 A * | 4/1982 | Stephan ................. 280/124.155 |
| 6,918,701 B2 * | 7/2005 | Ueno et al. ..................... 384/420 |
| 2003/0137091 A1 * | 7/2003 | Chesne .......................... 267/292 |
| 2004/0028303 A1 | 2/2004 | Ueno et al. |

(Continued)

FOREIGN PATENT DOCUMENTS

| DE | 3809703 | * 10/1989 |
| EP | 1 548 303 A1 | 6/2005 |

(Continued)

OTHER PUBLICATIONS

International Search Report for PCT/JP2008/000658, mailed May 13, 2008.

(Continued)

*Primary Examiner* — James Pilkington
(74) *Attorney, Agent, or Firm* — Nixon & Vanderhye, P.C.

(57) ABSTRACT

A thrust sliding bearing 1 includes an synthetic resin-made annular bearing body 5 having an annular upper surface 2, an annular outer peripheral surface 3, and an annular lower surface 4; a synthetic resin-made annular bearing body 7 having an annular lower surface 6; a sheet metal-made reinforcement member 10 having an annular lower surface 8 and an annular upper surface 9; a synthetic resin-made thrust sliding bearing piece 11 interposed between the annular upper surface 9 of the reinforcement member 10 and the annular lower surface 6 of the bearing body 7; and a synthetic resin-made radial sliding bearing piece 16 disposed between an annular inner peripheral surface 13 of a hollow cylindrical portion 12 of the reinforcement member 10 and an annular outer peripheral surface 15 of a hollow cylindrical portion 14 of the bearing body 7.

4 Claims, 4 Drawing Sheets

(56) References Cited

U.S. PATENT DOCUMENTS

| | | |
|---|---|---|
| 2006/0215944 A1 | 9/2006 | Watai et al. |
| 2006/0215945 A1 | 9/2006 | Miyata et al. |
| 2007/0237439 A1 | 10/2007 | Watai et al. |

FOREIGN PATENT DOCUMENTS

| | | | |
|---|---|---|---|
| FR | 2 867 421 | | 9/2005 |
| JP | 2001-027227 | * | 1/2001 |
| JP | 2002-257146 A | | 9/2002 |
| JP | 2004-225863 | | 8/2004 |
| JP | 2004-293589 A | | 10/2004 |
| WO | WO 01/92040 A1 | | 12/2001 |

OTHER PUBLICATIONS

Extended European Search Report in EP 08 72 0543 dated Jan. 25, 2011.

Office Action issued in Chinese Patent Application No. 200880008830.1 issued on Oct. 12, 2010 (with translation).

* cited by examiner

THRUST SLIDING BEARING AND COMBINATION MECHANISM OF THE THRUST SLIDING BEARING AND PISTON ROD WITH COIL SPRING

This application is the U.S. national phase of International Application No. PCT/JP2008/000658 filed 19 Mar. 2008, which designated the U.S. and claims priority to Japan Application No. 2007-073627 filed 20 Mar. 2007, the entire contents of which are hereby incorporated by reference.

TECHNICAL FIELD

The present invention relates to a thrust sliding bearing, and more particularly to a thrust sliding bearing which is suitably incorporated as a sliding bearing of a strut-type suspension (Macpherson type) in a four-wheeled vehicle, as well as a combination mechanism of the thrust sliding bearing and a piston rod with a coil spring of a shock absorber in a strut-type suspension.

BACKGROUND ART

[Patent Document 1] JP-A-8-326758
[Patent Document 2] JP-A-2004-263773
[Patent Document 3] JP-A-2004-225754

A strut-type suspension used for a front wheel of a four-wheeled vehicle has a structure in which a strut assembly incorporating a hydraulic shock absorber in an outer cylinder integrated with a main shaft is combined with a coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling bearing, a synthetic resin-made thrust sliding bearing is used between a mechanism for mounting the strut assembly to the vehicle body and a sheet metal-made upper spring seat member which receives one end of coil spring in order to allow a smooth rotation of the strut assembly.

DISCLOSURE OF THE INVENTION

Problems to be Solved by the Invention

Incidentally, in the strut assembly, the coil spring is received at its one end portion by the sheet metal-made upper spring seat member, as described above, and since the sheet metal-made upper spring seat member is likely to be splashed with or covered with rainwater and mud during traveling, an anti-corrosion measure such as coating needs to be provided for the upper spring seat member. Further, when the strut assembly together with the synthetic resin-made thrust sliding bearing is assembled to the vehicle body, two steps or two kinds of operation are required including the mounting of the synthetic resin-made thrust sliding bearing and the mounting of the upper spring seat member. Therefore, it cannot necessarily be said that the assembling efficiency is excellent, and higher cost is entailed. Furthermore, in the case where the sheet metal-made upper spring seat member is used, since the coil spring is formed of metal, the contact between the one end of the coil spring and the upper spring seat member becomes that between metals, so that rigid interference can possibly occur therebetween.

The present invention has been devised in view of the above-described aspects, and its object is to provide a thrust sliding bearing which, without using the sheet metal-made upper spring seat member, is capable of receiving the one end of the coil spring and thereby renders unnecessary an anti-corrosion measure such as coating required in the use of the sheet metal-made upper spring seat member, and which is capable of simplifying the operation of assembling the strut assembly to enable cost reduction of and of eliminating rigid interference due to contact between metals, as well as a combination mechanism of this thrust sliding bearing and a piston rod with a coil spring in a strut assembly.

Means for Overcoming the Problems

A thrust sliding bearing in accordance with the present invention comprises: a synthetic resin-made annular first bearing body having an annular upper surface and an annular lower surface; a synthetic resin-made annular second bearing body which is superposed on the first bearing body so as to be relatively rotatable about an axis of the first bearing body and has an annular lower surface opposed to the annular upper surface of the first bearing body; a sheet metal-made reinforcement member having an annular lower surface in contact with the annular upper surface of the first bearing body and an annular upper surface opposed to the annular lower surface of the second bearing body; and thrust sliding bearing means interposed between the annular upper surface of the reinforcement member and the annular lower surface of the second bearing body and having an annular lower surface and an annular upper surface which are respectively in slidable contact with the annular upper surface of the reinforcement member and the annular lower surface of the second bearing body, wherein the first bearing body is adapted to receive at the annular lower surface thereof one end of a coil spring.

According to the thrust sliding bearing in accordance with the invention, the sheet metal-made reinforcement member is provided which has an annular lower surface in contact with the annular upper surface of the first bearing body and an annular upper surface opposing the annular lower surface of the second bearing body, and the first bearing body is adapted to receive at its annular lower surface the one end of the coil spring. Therefore, it is possible to disuse the sheet metal-made upper spring seat member. Hence, it is possible to render unnecessary an anti-corrosion measure such as coating required in the use of the sheet metal-made upper spring seat member. Moreover, the operation of assembling the strut assembly to the vehicle body can be simplified, making it possible to achieve cost reduction. Furthermore, it is possible to eliminate rigid interference due to contact between metals.

In a preferred example, the first bearing body has an annular inner peripheral surface continuous to an inner peripheral edge of the annular upper surface thereof; the reinforcement member includes an annular plate portion having the annular lower surface and the annular upper surface, and a hollow cylindrical portion extending integrally from an inner peripheral edge of the annular plate portion in an axial direction and having an annular outer peripheral surface in contact with the annular inner peripheral surface of the first bearing body; the second bearing body includes an upper bearing main body having the annular lower surface and a hollow cylindrical portion extending integrally from an inner peripheral edge of the upper bearing main body in the axial direction and having an annular outer peripheral surface opposed to an annular inner peripheral surface of the hollow cylindrical portion of the reinforcement member; and radial sliding bearing means is disposed between the annular inner peripheral surface of the hollow cylindrical portion of the reinforcement member and the annular outer peripheral surface of the hollow cylindrical portion of the second bearing body.

In the invention, the thrust sliding bearing means may have a synthetic resin-made thrust sliding bearing piece which is separate from the second bearing body, or may have in substitution thereof a synthetic resin-made thrust sliding bearing portion formed integrally with the second bearing body.

The first bearing body is formed of a synthetic resin, and, specifically, as the synthetic resin it is possible to cite a thermoplastic resin such as polyacetal resin, polyamide resin, or the like, or a reinforced synthetic resin in which a reinforcing filler such as glass fiber, carbon fiber, or the like is contained in such a resin.

The second bearing body may be formed of a synthetic resin including at least one of polyacetal resin, polyamide resin, thermoplastic polyester resin, polyolefin resin, polycarbonate resin, and fluororesin. In the case where the thrust sliding bearing means is embodied by the thrust sliding bearing piece, such a thrust sliding bearing piece may be formed of a synthetic resin including at least one of polyacetal resin, polyamide resin, thermoplastic polyester resin, polyolefin resin, and fluororesin. As for the second bearing body, a synthetic resin similar to the synthetic resin constituting the thrust sliding bearing piece can be used, but particularly a synthetic resin which exhibits satisfactory friction characteristics when combined with the synthetic resin used for the thrust sliding bearing piece is used. To illustrate examples of desirable combinations thereof, it is possible to cite the following combinations for the thrust sliding bearing piece and the second bearing body: a combination of polyacetal resin and polyamide resin; a combination of a polyolefin resin, particularly polyethylene resin, and polyacetal resin; a combination of polyacetal resin and a thermoplastic polyester resin, particularly polybutylene terephthalate resin; and a combination of polyacetal resin and polyacetal resin. The radial sliding bearing piece may be fanned of a synthetic resin similar to that of the thrust sliding bearing piece.

The sheet metal-made reinforcement member in a preferred example is formed of a steel plate made of such as steel, stainless steel, or the like, but may alternatively be formed of a nonferrous alloy plate made of such as a copper alloy, a titanium alloy, or the like.

A combination mechanism of a thrust sliding bearing and a piston rod with a coil spring in accordance with the invention, or a combination mechanism for use in a strut-type suspension in a four-wheeled vehicle in a preferred example, comprises: the thrust sliding bearing according to either one of the above-described aspects; and a piston rod and a coil spring of a shock absorber in a strut-type suspension, wherein the piston rod is fixed at its upper end portion to a mounting plate of a mounting mechanism for mounting to a vehicle body, one end of the coil spring is in contact with the annular lower surface of the first bearing body, and the second bearing body has its annular upper surface in contact with a lower surface of a mounting plate.

Advantages of the Invention

According to the invention, it is possible to provide a thrust sliding bearing which, without using the sheet metal-made upper spring seat member, is capable of receiving the one end of the coil spring and thereby renders unnecessary an anticorrosion measure such as coating required in the use of the sheet metal-made upper spring seat member, and which is capable of simplifying the operation of assembling the strut assembly to enable cost reduction and of eliminating rigid interference due to contact between metals, as well as a combination mechanism of this thrust sliding bearing and a piston rod with a coil spring in a strut assembly.

Hereafter, a more detailed description will be given of the mode for carrying out the invention on the basis of preferred embodiments illustrated in the drawings. It should be noted that the present invention is not limited to these embodiments.

BEST MODE FOR CARRYING OUT THE INVENTION

Figure 1:
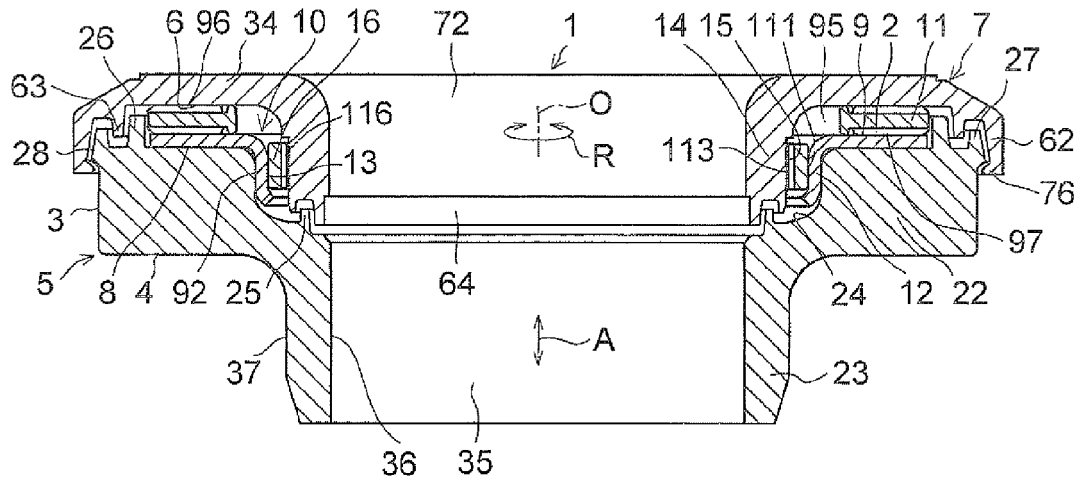
FIG. 1 is a cross-sectional view of an embodiment of the invention.
Figure 2:
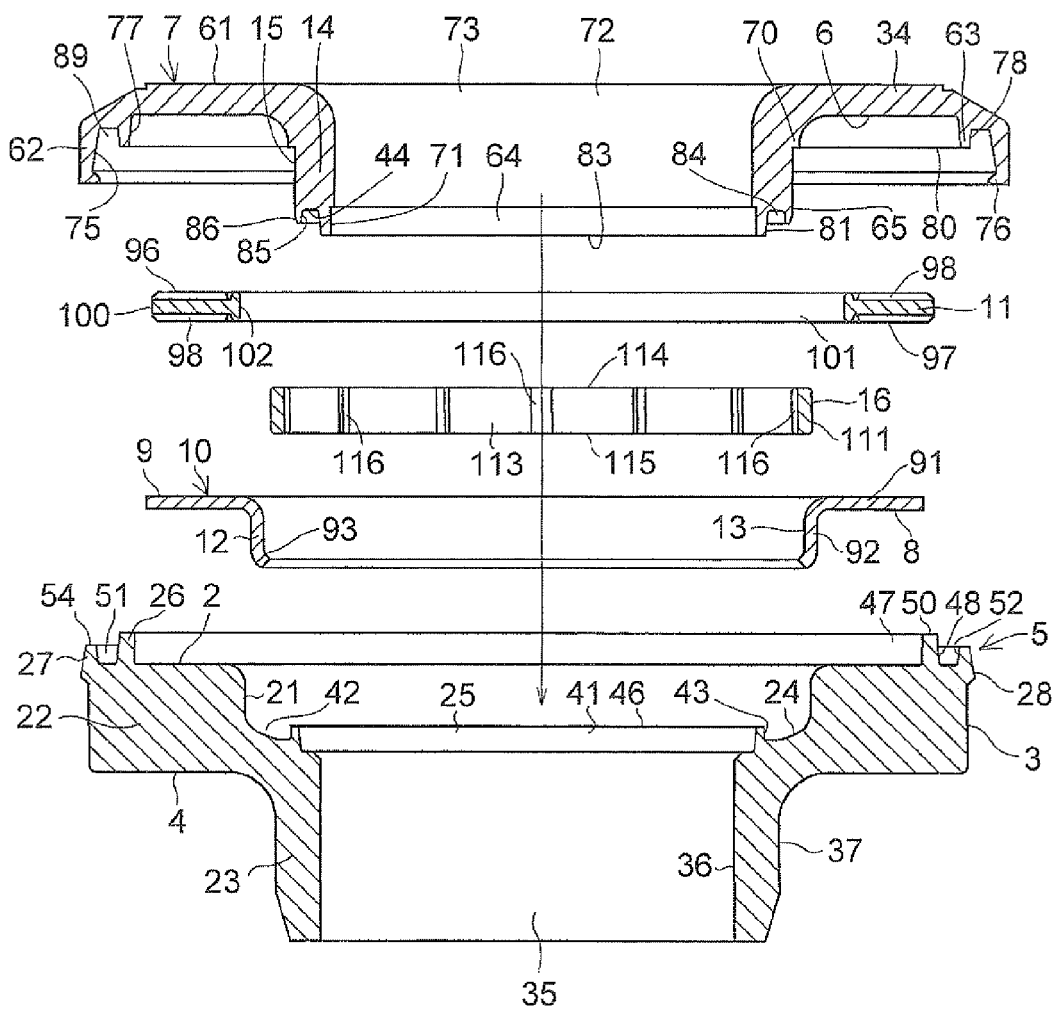
FIG. 2 is an exploded cross-sectional view of the embodiment shown in FIG. 1.
Figure 3:
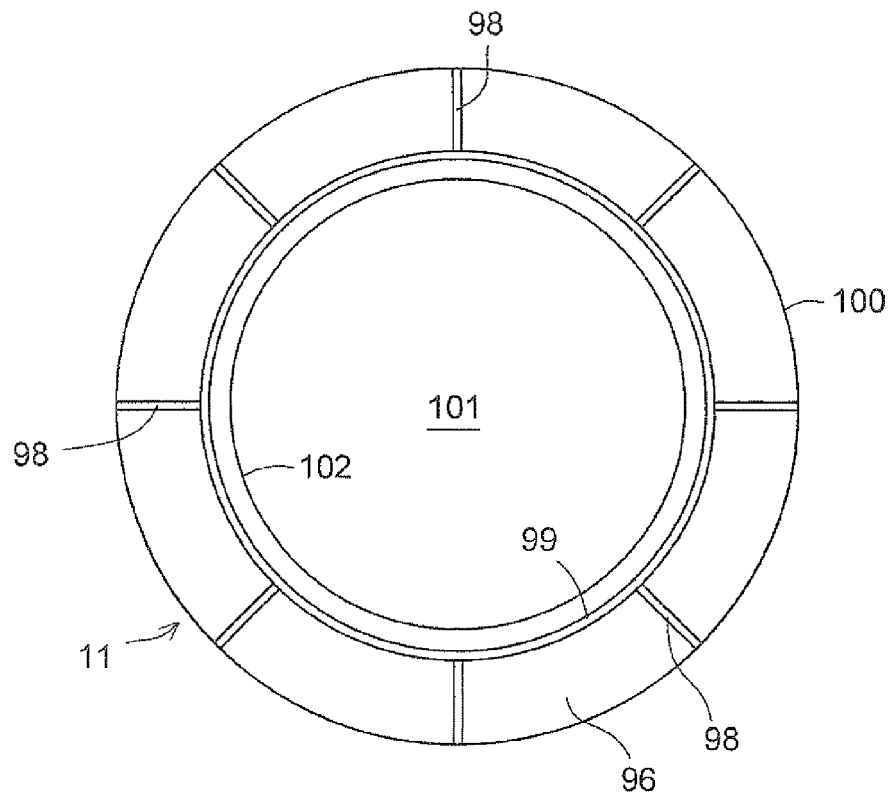
FIG. 3 is a plan view of a thrust sliding bearing piece in the embodiment shown in FIG. 1.
Figure 4:
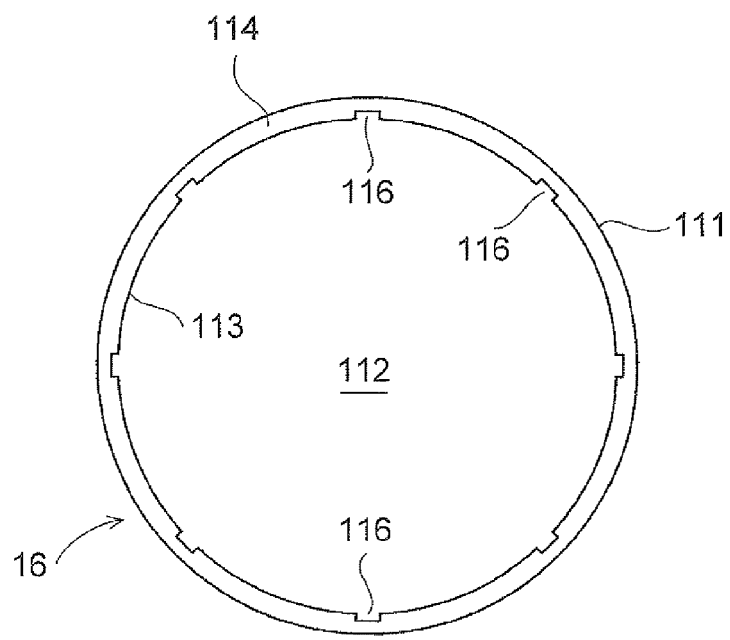
FIG. 4 is a plan view of a radial sliding bearing piece in the embodiment shown in FIG. 1.
Figure 5:
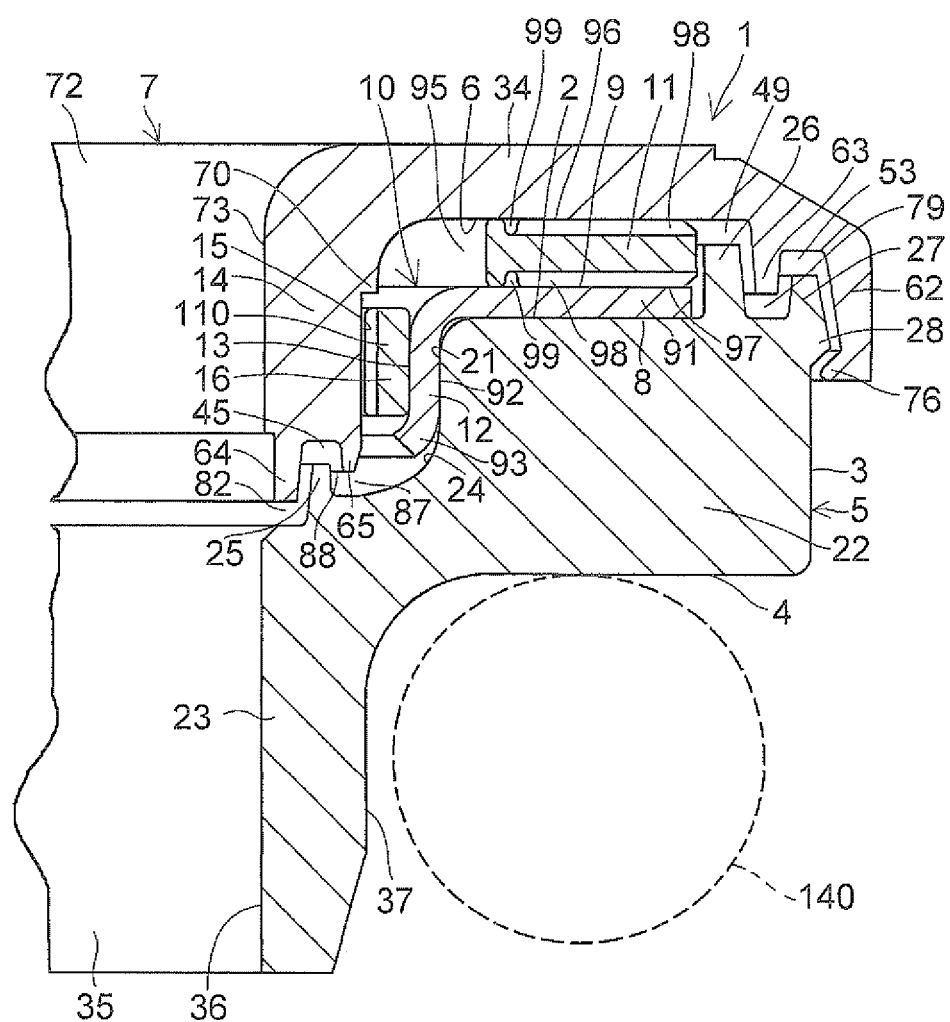
FIG. 5 is a partially enlarged cross-sectional view of the embodiment shown in FIG. 1.

In FIGS. 1 to 5, a thrust sliding bearing 1 of this embodiment includes a synthetic resin-made annular bearing body 5 having an annular upper surface 2 extending perpendicularly to an axial direction A, i.e., extending in a radial direction, an annular outer peripheral surface 3 extending in the axial direction A continuously to an outer peripheral edge of the annular upper surface 2, and an annular lower surface 4 extending perpendicularly to the axial direction A and opposed to the annular upper surface 2; a synthetic resin-made annular bearing body 7 which is superposed on the bearing body 5 so as to be relatively rotatable about an axis O of the bearing body 5 in an R direction, and has an annular lower surface 6 opposed to the annular upper surface 2 of the bearing body 5 and extending perpendicularly to the axial direction A; a sheet metal-made reinforcement member 10 having an annular lower surface 8 extending perpendicularly to the axial direction A and contacting the annular upper surface 2 of the bearing body 5 and an annular upper surface 9 opposed to the annular lower surface 6 of the bearing body 7 and extending perpendicularly to the axial direction A; an annular synthetic resin-made thrust sliding bearing piece 11 which serves as a thrust sliding bearing means interposed between the annular upper surface 9 of the reinforcement member 10 and the annular lower surface 6 of the bearing body 7, and which is formed separately from the reinforcement member 10 and the bearing body 7; and an annular synthetic resin-made radial sliding bearing piece 16 serving as a radial sliding bearing means disposed between an annular inner peripheral surface 13 of a hollow cylindrical portion 12 of the reinforcement member 10 and an annular outer peripheral surface 15 of a hollow cylindrical portion 14 of the bearing body 7.

The bearing body 5 integrally includes an annular lower bearing main body 22 having the annular upper surface 2, the annular outer peripheral surface 3, an annular inner peripheral surface 21 continuous to an inner peripheral edge of the annular upper surface 2 and extending in the axial direction A, and the annular lower surface 4 continuous to the annular outer peripheral surface 3; a hollow cylindrical portion 23 extending diagonally radially inwardly from the annular inner peripheral surface 21 of the lower bearing main body 22 and then extending suspendedly in the axial direction A; an annular inner projecting portion 25 formed integrally with a recessedly curved upper end face 24 of the hollow cylindrical portion 23 continuous to the annular inner peripheral surface 21 and standing upright from the recessedly curved upper end face 24 toward the annular lower surface 6; an annular outer projecting portion 26 formed integrally with the annular upper surface 2 of the lower bearing main body 22 standing uprightly toward the annular lower surface 6 and disposed radially outwardly of the inner projecting portion 25; an annular outermost edge side projecting portion 27 formed integrally at an outermost edge of the annular upper surface 2 of the lower bearing main body 22 standing uprightly toward the annular lower surface 6 and disposed radially outwardly of the outer projecting portion 26; and an annular engaging projection 28 formed integrally with the lower bearing main body 22 and the outermost edge side projecting portion 27 and projecting radially outwardly from a portion of the annular outer peripheral surface 3 of the lower bearing main body 22 and the annular outer peripheral surface of the outermost edge side projecting portion 27.

The lower bearing main body 22 has a sufficiently larger thickness in the axial direction A than the thickness in the axial direction A of an upper bearing main body 34 of the bearing body 7. It should be noted that the thickness of the lower bearing main body 22 may be identical to the thickness in the axial direction A of the upper bearing main body 34 of the bearing body 7, depending on the synthetic resin for forming the lower bearing main body 22.

The hollow cylindrical portion 23 includes, in addition to the recessedly curved upper end face 24, an annular inner peripheral surface 36 which is continuous to the recessedly curved upper end face 24 to define a central through hole 35 and which extends in the axial direction A, as well as an annular outer peripheral surface 37 continuous to the annular lower surface 4 and extending in the axial direction A.

The inner projecting portion 25 has an annular inner peripheral surface 41 having a larger diameter than the diameter of the annular inner peripheral surface 36; an annular outer peripheral surface 43 defining an annular recess 42 in cooperation with the recessedly curved upper end face 24; and an annular top surface 46 opposing a lower end face 44 of the inner hollow cylindrical portion 14 with an annular gap 45 therebetween. The outer projecting portion 26 having an annular inner peripheral surface 47 and outer peripheral surface 48 has an annular top surface 50 which opposes the annular lower surface 6 with an annular gap 49 therebetween. The outermost edge side projecting portion 27 has an annular inner peripheral surface 52 defining an annular recess 51 in cooperation with the annular upper surface 2 and the outer peripheral surface 48, as well as an annular top surface 54 opposing the annular lower surface 6 with an annular gap 53 therebetween.

The bearing body 7 integrally includes the upper bearing main body 34 having the annular lower surface 6 and an annular upper surface 61 opposing the annular lower surface 6; the inner hollow cylindrical portion 14 extending suspendedly from an inner peripheral edge of the lower surface 6 of the upper bearing main body 34 in the axial direction A; an outer hollow cylindrical portion 62 extending suspendedly from an outer peripheral edge of the lower surface 6 of the upper bearing main body 34 in the axial direction A; an annular projecting portion 63 formed integrally with the annular lower surface 6 of the upper bearing main body 34 and suspended from the annular lower surface 6 toward the annular upper surface 2 of the lower bearing main body 22; an annular projecting portion 64 formed integrally with the lower end face 44 of the hollow cylindrical portion 14 and suspended toward the recessedly curved upper end face 24; and an annular projecting portion 65 formed integrally with the lower end face 44 of the hollow cylindrical portion 14 on the radially outer side of the projecting portion 64 and suspended toward the recessedly curved upper end face 24.

In addition to the annular outer peripheral surface 15 continuous to the inner peripheral edge of the annular lower surface 6 through a stepped portion 70 and the lower end face 44 opposing the recessedly curved upper end face 24, the hollow cylindrical portion 14 includes an annular inner peripheral surface 73 which defines a central through hole 72 concentric with the central through hole 35 in cooperation with an inner peripheral surface 71 of the projecting portion 64 and extends in the axial direction A in a manner continuous to an inner peripheral edge of the annular upper surface 61.

The hollow cylindrical portion 62 includes an annular inner peripheral surface 75 opposing the engaging projection 28, as well as an engaging projection 76 which is integrally formed with the inner peripheral surface 75 so as to project radially inwardly from that inner peripheral surface 75, and engages the engaging projection 28 in a snap-fit manner. The arrangement provided is such that easy cancellation of the superposition of the bearing body 5 and the bearing body 7 is prevented by the engagement of the engaging projection 76 with the engaging projection 28.

The projecting portion 63 has an inner peripheral surface 77 opposing the outer peripheral surface 48 with a gap therebetween, an outer peripheral surface 78 opposing the inner peripheral surface 52 with a gap therebetween, and a top surface 80 opposing the annular upper surface 2 with a gap 79 therebetween and disposed in the recess 51. In addition to the inner peripheral surface 71, the projecting portion 64 includes an outer peripheral surface 81 opposing the inner peripheral surface 41 with a gap therebetween and an annular top surface 83 opposing the recessedly curved upper end face 24 with a gap 82 therebetween. The projecting portion 65 includes an inner peripheral surface 85 which defines an annular recess 84 in cooperation with the lower end face 44 and the outer peripheral surface 81; an outer peripheral surface 86 continuous to the annular outer peripheral surface 15; and an annular top surface 88 opposing the recessedly curved upper end face 24 with a gap 87 therebetween, the annular top surface 46 of the inner projecting portion 25 being disposed in the annular recess 84. The outer peripheral surface 78 of the projecting portion 63 defines an annular recess 89 in cooperation with the annular lower surface 6 and the inner peripheral surface 75, and the annular top surface 54 of the outermost edge side projecting portion 27 is disposed in the recess 89.

The reinforcement member 10 integrally includes an annular plate portion 91 having the annular lower surface 8 and the annular upper surface 9 and extending perpendicularly to the axial direction A; the hollow cylindrical portion 12 extending integrally from the inner peripheral edge of the annular plate portion 91 in an axial direction A and having, in addition to the annular inner peripheral surface 13, an annular outer peripheral surface 92 which is in contact with the annular inner peripheral surface 21 of the lower bearing main body 22 of the bearing body 5; and an annular reduced-diameter portion 93 integrally extending from the lower end of the hollow cylindrical portion 12 radially inwardly. The annular outer peripheral surface 15 of the hollow cylindrical portion 14 opposes the annular inner peripheral surface 13 of the hollow cylindrical portion 12.

The disk-shaped thrust sliding bearing piece 11 is disposed in a space 95 between the annular outer peripheral surface 15 of the hollow cylindrical portion 14 and the inner peripheral surface 47 of the outer projecting portion 26 in the radial direction, and is radially positioned by the inner peripheral surface 47 of the outer projecting portion 26. This disk-shaped thrust sliding bearing piece 11 includes a flat annular upper surface 96 which is brought into contact with the annular lower surface 6 of the upper bearing main body 34 relatively slidably in the R direction; a flat annular lower surface 97 which is brought into contact with the annular upper surface 9 of the reinforcement member 10 relatively slidably in the R direction; a plurality of radially extending grooves 98 and an annular groove 99 communicating with the plurality of grooves 98, the plurality of grooves 98 and the annular groove 99 being provided in each of the upper surface 96 and the lower surface 97; an annular outer peripheral surface 100 which is brought into contact with the inner peripheral surface 47 of the outer projecting portion 26 relatively slidably in the R direction; and an annular inner peripheral surface 102 defining a central through hole 101. In the same way as the annular lower surface 6 and the annular upper surface 9, the upper surface 96 and the lower surface 97 extend flatly and perpendicularly to the axis O, and a lubricant such as grease is adapted to be accumulated in the plurality of grooves 98 and the groove 99 in each of the upper surface 96 and the lower surface 97.

The annular radial sliding bearing piece 16 is disposed in an annular space 110 between the annular inner peripheral surface 13 of the hollow cylindrical portion 12 and the annular outer peripheral surface 15 of the hollow cylindrical portion 14 in the radial direction, and is positioned with respect to the axial direction A by the stepped portion 70 and the reduced-diameter portion 93. This annular radial sliding bearing piece 16 has an annular outer peripheral surface 111 capable of coming into contact with the annular inner peripheral surface 13 relatively slidably in the R direction; an annular inner peripheral surface 113 capable of coming into contact with the annular outer peripheral surface 15 relatively slidably in the R direction and defining a central through hole 112; and a plurality of grooves 116 which extend in the axial direction A, are open in an annular upper end face 114 and a lower end face 115, and are formed in the annular inner peripheral surface 113.

The space 95 where the thrust sliding bearing piece 11 and the annular plate portion 91 of the reinforcement member 10 are disposed communicates on its radially outer peripheral side with the outside through an outer labyrinth including the gaps 49, 53 and 79, and communicates with the space 110 on its radially inner peripheral side. The space 110 on its axially lower side communicates with the outside through an inner labyrinth including the gaps 45 and 82, and the space 95 communicates on its radially inner peripheral side with the outside through an inner labyrinth consisting of the space 110 and the grooves 116 as well as the gaps 45 and 82.

In the above-described thrust sliding bearing 1, the bearing body 5 and the bearing body 7 are superposed on and coupled to each other by means of the snap-fit type engagement of the engaging projection 76 with the engaging projection 28 making use of the flexibility of the synthetic resin, such that the reinforcement member 10, the radial sliding bearing piece 16, and the thrust sliding bearing piece 11 are accommodated between the bearing body 5 and the bearing body 7. In the relative rotation of the bearing body 5 and the reinforcement member 10 with respect to the bearing body 7 about the axis O in the R direction, low-friction sliding in the R direction is caused between the upper surface 96 of the thrust sliding bearing piece 11 and the annular lower surface 6 of the upper bearing main body 34 or between the lower surface 97 of the thrust sliding bearing piece 11 and the annular upper surface 9 of the reinforcement member 10. In such relative rotation of the bearing body 5 and the reinforcement member 10 with respect to the bearing body 7 about the axis O in the R direction, in a case where the bearing body 5 and the reinforcement member 10 are radially displaced with respect to the bearing body 7, low-friction sliding in the R direction is caused between the annular outer peripheral surface 111 of the radial sliding bearing piece 16 and the annular inner peripheral surface 13 of the hollow cylindrical portion 12 or low-friction sliding in the R direction is caused between the annular inner peripheral surface 113 of the radial sliding bearing piece 16 and the annular outer peripheral surface 15 of the hollow cylindrical portion 14. Thus, the relative rotation of the bearing body 5 and the reinforcement member 10 with respect to the bearing body 7 about the axis O in the R direction is allowed to be effected with extremely low frictional resistance.

Figure 6:
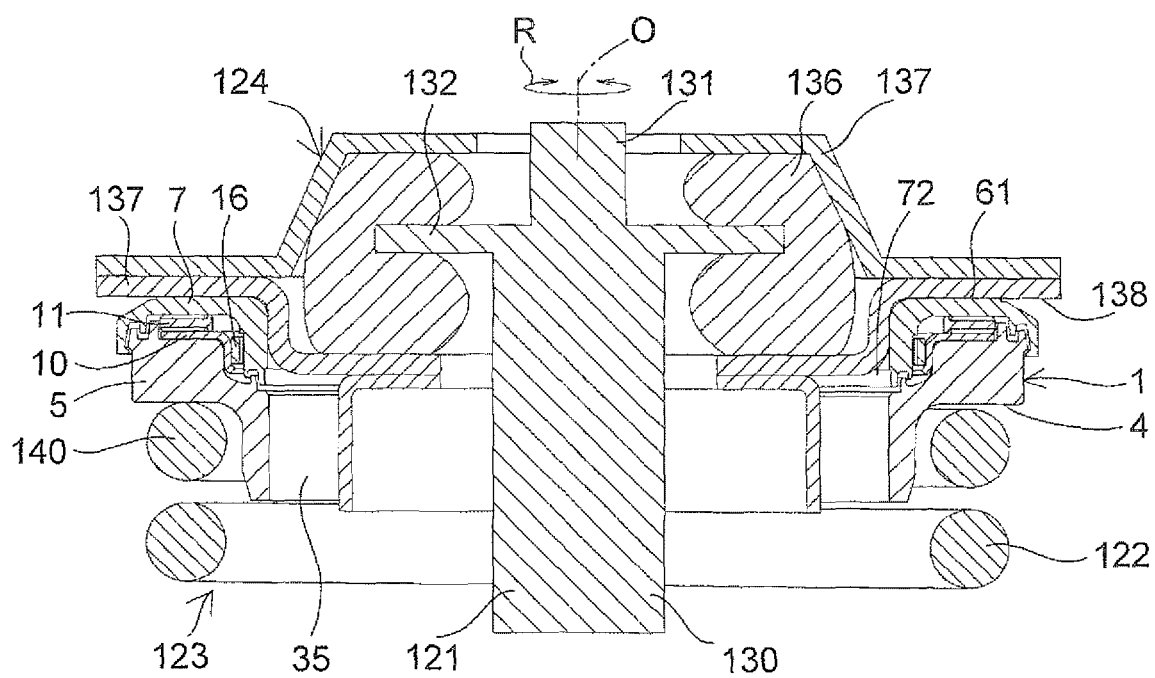
FIG. 6 is a cross-sectional view of an embodiment in which the embodiment shown in FIG. 1 is used in a strut-type suspension.

As shown in FIG. 6, such a thrust sliding bearing 1 is used by being interposed between, on the one hand, a strut-type suspension of a vehicle, e.g., a strut-type suspension 123 of a four-wheeled vehicle, which includes a hydraulic shock absorber (not shown) having a piston rod 121 therein and a coil spring 122 disposed so as to surround such a hydraulic shock absorber, and, on the other hand, a mounting mechanism 124 for mounting the strut-type suspension 123 to the vehicle body.

The piston rod 121 includes a large-diameter main body portion 130 which is passed through the central through holes 35 and 72 of the bearing body 5 and the bearing body 7; a small-diameter upper end portion 131 whose diameter is smaller than the main body portion 130 and which is formed integrally with the main body portion 130; and a collar portion 132 which is formed between the main body portion 130 and the upper end portion 131 integrally therewith. The mounting mechanism 124 includes an annular resilient member 136 with the collar portion 132 embedded therein, as well as a pair of mounting plates 137 for clamping the resilient member 136 therebetween and secured to each other by threading or welding. The piston rod 121 is thus fixed at its upper end portion 131 to the mounting plate 137 of the mounting mechanism 124 for mounting to the vehicle body. The thrust sliding bearing 1 is interposed between the coil spring 122 and the lower mounting plate 137 such that the annular upper surface 61 of the bearing body 7 is brought into contact with and pressed against an annular lower surface 138 of the lower mounting plate 137 by the resiliency of the coil spring 122. The bearing body 5 is adapted to receive at its annular lower surface 4 as a receiving portion one end 140 of the coil spring 122 which is in contact with that annular lower surface 4.

In the above-described combination mechanism of the thrust sliding bearing 1 and the piston rod 121 with the coil spring 122 in the strut-type suspension 123, when the coil spring 122 is rotated about the axis O in the R direction by the steering operation, the bearing body 5 is similarly rotated relatively in the R direction with respect to the bearing body 7. This rotation of the bearing body 5 is effected smoothly by the thrust sliding bearing piece 11 disposed between the bearing body 5 and the bearing body 7, so that the steering operation is performed without resistance.

According to the thrust sliding bearing 1, the sheet metal-made reinforcement member 10 is provided which has the annular lower surface 8 in contact with the annular upper surface 2 of the bearing body 5 and the annular upper surface 9 opposing the annular lower surface 6 of the bearing body 7, and the bearing body 5 is adapted to receive at its annular lower surface 4 the one end 140 of the coil spring 122. Therefore, it is possible to disuse the sheet metal-made upper spring seat member. Hence, it is possible to render unnecessary an anti-corrosion measure such as coating required in the use of the sheet metal-made upper spring seat member. Moreover, the operation of assembling the thrust sliding bearing 1 and the strut-type suspension 123 to the vehicle body can be simplified, making it possible to achieve cost reduction. Furthermore, it is possible to eliminate rigid interference due to contact between metals.

The above-described thrust sliding bearing 1 is an example in which the thrust sliding bearing piece 11 which is separate from the bearing body 7 is provided as the thrust sliding bearing means, but a synthetic resin-made annular thrust sliding bearing portion which is formed integrally with the annular lower surface 6 of the bearing body 7 may alternatively be provided as the thrust sliding bearing means.

The invention claimed is:

1. A thrust sliding bearing comprising: a synthetic resin-made annular first bearing body having an annular upper surface and an annular lower surface; a synthetic resin-made annular second bearing body which is superposed on said first bearing body so as to be relatively rotatable about an axis of said first bearing body and has an annular lower surface opposed to the annular upper surface of said first bearing body; a sheet metal-made reinforcement member having an annular lower surface in contact with the annular upper surface of said first bearing body and an annular upper surface opposed to the annular lower surface of said second bearing body; and thrust sliding bearing means interposed between the annular upper surface of said reinforcement member and the annular lower surface of said second bearing body and having an annular lower surface and an annular upper surface which are respectively in slidable contact with the annular upper surface of said reinforcement member and the annular lower surface of said second bearing body, wherein said first bearing body is adapted to receive at the annular lower surface thereof one end of a coil spring, said first bearing body including an annular lower bearing main body having the annular upper surface of said first bearing body, and an annular inner peripheral surface extending from an inner peripheral edge of the annular upper surface of said first bearing body and extending in the axial direction, said reinforcement member including an annular plate portion having the annular lower surface of said reinforcement member and the annular upper surface of said reinforcement member, and a hollow cylindrical portion extending integrally from an inner peripheral edge of the annular plate portion in the axial direction and having an annular outer peripheral surface which is in contact with the annular inner peripheral surface of the annular lower bearing main body of the first bearing body.

2. A thrust sliding bearing comprising: a synthetic resin-made annular first bearing body having an annular upper surface and an annular lower surface; a synthetic resin-made annular second bearing body which is superposed on said first bearing body so as to be relatively rotatable about an axis of said first bearing body and has an annular lower surface opposed to the annular upper surface of said first bearing body; a sheet metal-made reinforcement member having an annular lower surface in contact with the annular upper surface of said first bearing body and an annular upper surface opposed to the annular lower surface of said second bearing body; and thrust sliding bearing means interposed between the annular upper surface of said reinforcement member and the annular lower surface of said second bearing body and having an annular lower surface and an annular upper surface which are respectively in slidable contact with the annular upper surface of said reinforcement member and the annular lower surface of said second bearing body, wherein said annular lower surface of said first bearing body has a receiving portion for receiving one end of a coil spring, said receiving portion being adapted to be in direct contact with the one end of the coil spring, said annular lower surface of the first bearing body, said annular upper surface of the first bearing body, said annular lower surface of the reinforcement member, said annular upper surface of the reinforcement member, said annular lower surface of the thrust sliding bearing means, said annular upper surface of the thrust sliding bearing means and said annular lower surface of the second bearing body are juxtaposed and arranged in series to each other in an axial direction on a vertical line parallel to the axial direction and passing through the receiving portion, wherein said first bearing body has an annular inner peripheral surface continuous to an inner peripheral edge of the annular upper surface thereof; said reinforcement member includes an annular plate portion having the annular lower surface and the annular upper surface, and a hollow cylindrical portion extending integrally from an inner peripheral edge of the annular plate portion in the axial direction and having an annular outer peripheral surface in contact with the annular inner peripheral surface of said first bearing body; said second bearing body includes an upper bearing main body having the annular lower surface and a hollow cylindrical portion extending integrally from an inner peripheral edge of the upper bearing main body in the axial direction and having an annular outer peripheral surface opposed to an annular inner peripheral surface of the hollow cylindrical portion of said reinforcement member; and radial sliding bearing means is disposed between the annular inner peripheral surface of the hollow cylindrical portion of said reinforcement member and the annular outer peripheral surface of the hollow cylindrical portion of said second bearing body.

3. A combination mechanism of the thrust sliding bearing according to claim 2 and a piston rod with a coil spring of a shock absorber in a strut-type suspension, wherein said piston rod is fixed at an upper end portion of said piston rod to a mounting plate of a mounting mechanism for mounting to a vehicle body, and said second bearing body has an annular upper surface in contact with a lower surface of the mounting plate.

4. The combination mechanism of the thrust sliding bearing and the piston rod with the coil spring according to claim 3 for use in a strut-type suspension in a four-wheeled vehicle.

* * * * *